United States Patent
Wyss

(10) Patent No.: US 12,314,789 B2
(45) Date of Patent: May 27, 2025

(54) SYSTEMS AND METHODS FOR CONDUCTING AN AUTOMATED DIALOGUE

(71) Applicant: Genesys Cloud Services, Inc., Menlo Park, CA (US)

(72) Inventor: Felix Immanuel Wyss, Indianapolis, IN (US)

(73) Assignee: Genesys Cloud Services, Inc., Menlo Park, CA (US)

( * ) Notice: Subject to any disclaimer, the term of this patent is extended or adjusted under 35 U.S.C. 154(b) by 679 days.

(21) Appl. No.: 17/137,671

(22) Filed: Dec. 30, 2020

(65) Prior Publication Data
US 2022/0206884 A1 Jun. 30, 2022

(51) Int. Cl.
*G06F 9/54* (2006.01)
*G10L 13/04* (2013.01)
(Continued)

(52) U.S. Cl.
CPC .............. *G06F 9/548* (2013.01); *G10L 13/04* (2013.01); *G10L 15/22* (2013.01); *G10L 15/24* (2013.01); *G10L 19/018* (2013.01)

(58) Field of Classification Search
None
See application file for complete search history.

(56) References Cited

U.S. PATENT DOCUMENTS 6,425,082 B1 * 7/2002 Matsui ............. G11B 20/00086
380/207
8,589,148 B2 * 11/2013 Atallah ................. G06F 40/211
704/10

(Continued)

FOREIGN PATENT DOCUMENTS

WO 2020086107 A1 4/2020

OTHER PUBLICATIONS

Alattar et al.; "Digital watermarking of low bit-rate advanced simple profile MPEG-4 compressed video"; Aug. 2003; IEEE Transactions on Circuits and Systems for Video Technology, vol. 13, No. 8; pp. 787-800. (Year: 2003).*

(Continued)

*Primary Examiner* — Umut Onat
(74) *Attorney, Agent, or Firm* — Taft Stettinius & Hollister LLP

(57) ABSTRACT

A method for conducting an automated dialogue between an inbound automated voice resource (IAVR) and an outbound automated voice resource (OAVR) during a voice communication session. The IAVR receives an initiation of the session from the OAVR and transmits a speech communication to the OAVR during the session, wherein a digital watermark is embedded in the speech communication. The OAVR identifies the digital watermark in response to analyzing the speech communication and converts an OAVR communication language from speech to machine language in response to determining that the IAVR interprets machine language based on the digital watermark. The OAVR transmits a machine language communication to the IAVR, whereby the IAVR converts an IAVR communication language from speech to machine language in response to determining that the OAVR interprets machine language based on the machine language communication. The automated dialogue is completed between the IAVR and the OAVR using machine language.

18 Claims, 3 Drawing Sheets

(51) Int. Cl.
  *G10L 15/22* (2006.01)
  *G10L 15/24* (2013.01)
  *G10L 19/018* (2013.01)

(56) References Cited

U.S. PATENT DOCUMENTS

| | | |
|---|---|---|
| 10,694,038 B2 | 6/2020 | Abraham et al. |
| 11,393,456 B1 * | 7/2022 | Guo ................... G10L 15/063 |
| 2002/0052738 A1 * | 5/2002 | Paksoy ............... G10L 21/038 |
| | | 704/219 |
| 2004/0068399 A1 * | 4/2004 | Ding ................... G10L 21/038 |
| | | 704/E19.009 |
| 2006/0129406 A1 * | 6/2006 | Mandalia ............. G10L 15/30 |
| | | 704/E15.047 |
| 2006/0200260 A1 * | 9/2006 | Hoffberg ............. G06V 40/103 |
| | | 700/86 |
| 2008/0126294 A1 * | 5/2008 | Ray ..................... H04L 67/06 |
| 2012/0203561 A1 * | 8/2012 | Villette ............... G10L 19/0212 |
| | | 704/500 |
| 2019/0287513 A1 * | 9/2019 | Alameh ............... G10L 17/00 |
| 2020/0134022 A1 * | 4/2020 | Millius ................ G06F 40/56 |
| 2020/0143115 A1 | 5/2020 | Brigham et al. |

OTHER PUBLICATIONS

International Search Report and Written Opinion of the International Searching Authority; ISA/US; International Application No. PCT/US2021/054389; Feb. 17, 2022; 12 pages.

Yaniv Leviathan; Google Duplex: An AI System for Accomplishing Real-World Tasks Over the Phone; Google AI Blog; May 8, 2018; 6 pages.

* cited by examiner

SYSTEMS AND METHODS FOR CONDUCTING AN AUTOMATED DIALOGUE

BACKGROUND

Humans (i.e., users) may utilize intelligent agents to call enterprises and perform transactional dialogues via telephony calls on behalf of such humans. The intelligent agents may play a pre-recorded message depending on whether a human or answering machine/voicemail answers the telephony call. The pre-recorded messages may include multiple-choice menu messages that may be selected by humans (e.g., "press 1 to be routed to X" or "press 2 to be routed to Y"). For example, a physician's office may automatically call a patient and provide pre-recorded voice prompts for the patient to select from. With the recent advances in artificial intelligence, speech recognition, and natural language understanding, intelligent outbound voice-based agents (i.e., voice bots) are becoming viable. Voice bots may perform transactional operations and have a complex dialogue with humans rather than only playing pre-recorded messages. For example, voice bots may schedule a reservation at a restaurant or may schedule a visit with a physician.

Because many enterprises use voice bots to manage transactional phone dialogues, a voice bot interacting with another voice bot may become commonplace. However, using human speech as a communications language between two voice bots (i.e., machines) is inefficient, slow, and prone for errors compared to using machine language between such voice bots. A significant problem is that voice bots may not be able to identify each other as machines such that the voice bots may convert from communicating in human speech to machine language. Utilization of in-band signaling tones to indicate that machines rather than humans are placing and answering telephony calls has been used for computer modems and fax machines. For example, an inbound fax machine may determine that it is communicating with an outbound fax machine in response to identifying the in-band signaling tones transmitted by the outbound fax machine. Identification of the in-band signaling tones allows the inbound and outbound fax machines to know to communicate with each other using machine language. However, the in-band signaling tones (e.g., CNG 1100 Hz tones) transmitted by the outbound fax machine are audible to humans such that the human user experience would be diminished if in-band signaling tones were utilized by voice bots to identify themselves as machines during telephony calls.

SUMMARY

According to an embodiment, a method for conducting an automated dialogue between a first automated voice resource and a second automated voice resource during a voice communication session may include transmitting, by the first automated voice resource, a first communication comprising speech to the second automated voice resource during the voice communication session, wherein a digital watermark is embedded in the speech communication; receiving, by the first automated voice resource, a transmission from the second automated voice resource indicating a recognition by the second automated voice resource of the digital watermark; transmitting, by the first automated voice resource, a second communication comprising machine language to the second automated voice resource in response to receiving the transmission indicating recognition by the second automated voice resource of the digital watermark; and completing the automated dialogue between the first automated voice resource and the second automated voice resource using machine language.

In some embodiments, the method may further include at least one of determining, by the second automated voice resource, a type of machine language to convert to in response to evaluating the first automated voice resource type; and determining, by the first automated voice resource, a type of machine language to convert to in response to evaluating the second automated voice resource type.

In some embodiments, the first communication may include machine generated speech that may be comprehensible to a human listener.

In some embodiments, the machine language may include a communication that may be comprehensible to at least one of the first automated voice resource and the second automated voice resource and incomprehensible to a human listener.

In some embodiments, the machine language may be object code.

In some embodiments, the digital watermark may be embedded in the speech communication before an initiation of the voice communication session.

In some embodiments, the first automated voice resource may embed the digital watermark in the speech communication in real time after an initiation of the voice communication session.

In some embodiments, completing the automated dialogue between the first automated voice resource and the second automated voice resource using machine language may include ending the voice communication session; and utilizing an inter-service communication session.

According to another embodiment, a method for conducting an automated dialogue between an inbound automated voice resource and an outbound automated voice resource during a voice communication session may include receiving at the inbound automated voice resource an initiation of the voice communication session from the outbound automated voice resource; transmitting, by the inbound automated voice resource, a speech communication to the outbound automated voice resource during the voice communication session, wherein a digital watermark is embedded in the speech communication; identifying, by the outbound automated voice resource, the digital watermark in response to analyzing the speech communication; converting, by the outbound automated voice resource, an outbound automated voice resource communication language from speech to machine language in response to determining that the inbound automated voice resource interprets machine language based on the digital watermark; transmitting, by the outbound automated voice resource, a machine language communication to the inbound automated voice resource; converting, by the inbound automated voice resource, an inbound automated voice resource communication language from speech to machine language in response to determining that the outbound automated voice resource interprets machine language based on the machine language communication; and completing the automated dialogue between the inbound automated voice resource and the outbound automated voice resource using machine language.

In some embodiments, the method may further include at least one of determining, by the outbound automated voice resource, a type of machine language to convert to in response to evaluating the inbound automated voice resource type; and determining, by the inbound automated voice resource, a type of machine language to convert to in response to evaluating the outbound automated voice resource type.

In some embodiments, the machine language may be object code.

In some embodiments, the digital watermark may be embedded in the speech communication before the initiation of the voice communication session.

In some embodiments, the inbound automated voice resource may embed the digital watermark in the speech communication in real time after the initiation of the voice communication session.

In some embodiments, the method may further include utilizing a technique to enhance the robustness of the digital watermark before or after initiation of the voice communication session.

In some embodiments, completing the automated dialogue between the inbound automated voice resource and the outbound automated voice resource using machine language may include ending the voice communication session; and utilizing an inter-service communication session.

In some embodiments, the method may further include transmitting, by the inbound automated voice resource, a second machine language communication to the outbound automated voice resource in response to converting the inbound automated voice resource communication language from speech to machine language.

According to another embodiment, a system for conducting an automated dialogue during a voice communication session may include at least one processor; and at least one memory comprising a plurality of instructions stored thereon that, in response to execution by the at least one processor, causes the system to transmit, by an automated voice resource, an initiation of the voice communication session; receive at the automated voice resource a speech communication in response to initiation of the voice communication session, wherein a digital watermark is embedded in the speech communication; identify, by the automated voice resource, the digital watermark in response to analyzing the speech communication; convert, by the automated voice resource and based on the digital watermark, an automated voice resource communication language from speech to machine language; transmit, by the automated voice resource, a first machine language communication; receive at the automated voice resource a second machine language communication; and complete the automated dialogue.

In some embodiments, more than one digital watermark may be embedded in the speech communication.

In some embodiments, the plurality of instructions may further cause the system to utilize a technique to enhance the robustness of the digital watermark before or after initiation of the voice communication session.

In some embodiments, the digital watermark may be embedded in the speech communication before or after the initiation of the voice communication session.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION

Figure 1:
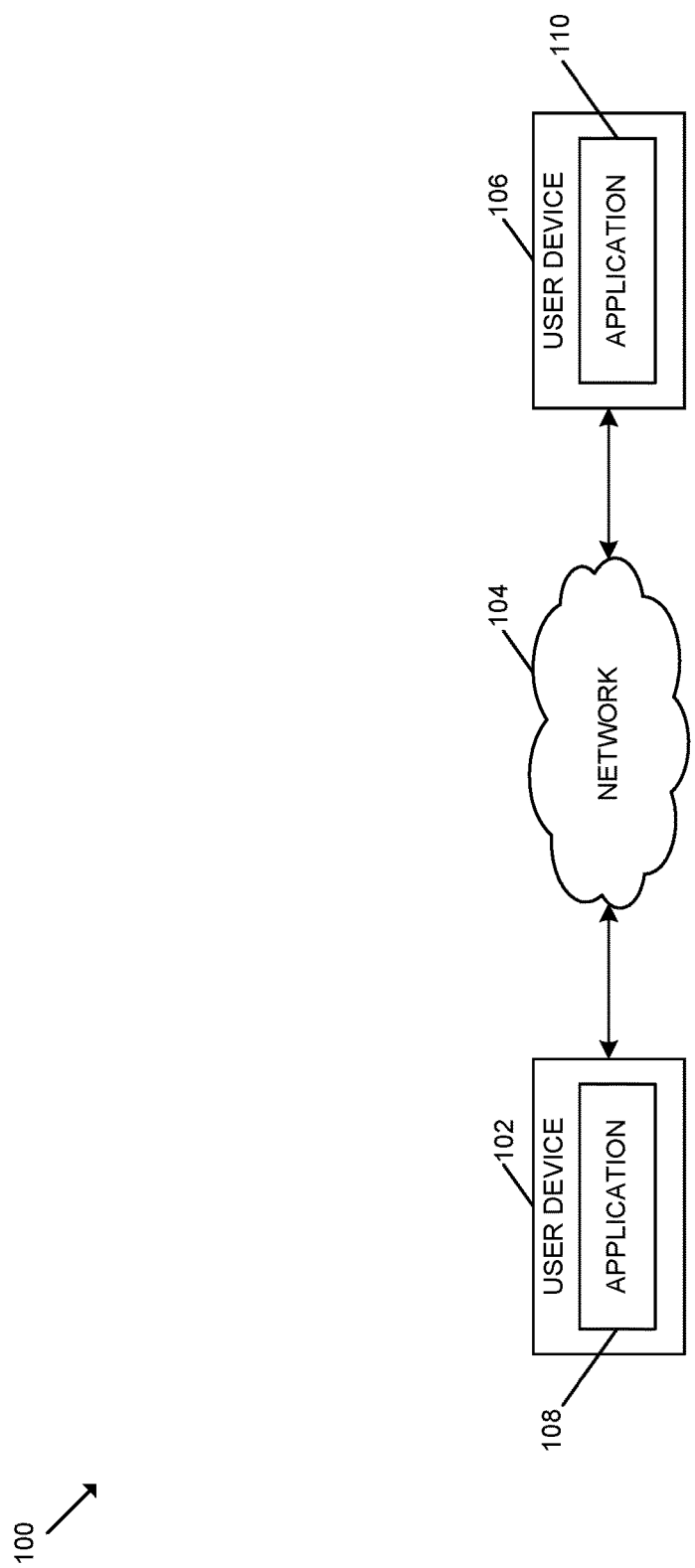
FIG. 1 is a simplified block diagram of at least one embodiment of a system for conducting an automated dialogue.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should be further appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, a system 100 for conducting an automated dialogue includes a user device 102, a network 104, and a user device 106. It should be appreciated that references to the user device 102 or the user device 106 herein may be made for clarity of the description and may be intended to be for illustrative purposes only. Accordingly, in some embodiments, such references to the user device 102 may be alternatively made with respect to the user device 106 without loss of generality. Although only one user device 102, one network 104, and one user device 106 are shown in the illustrative embodiment of FIG. 1, the system 100 may include multiple user devices 102, networks 104, and/or user devices 106 in other embodiments.

It should be appreciated that each of the user device 102, network 104, and user device 106 may be embodied as any type of device/system or collection of devices/systems suitable for performing the functions described herein. More specifically, in the illustrative embodiment, the user device 102 and/or the user device 106 may be a voice communications device, such as a telephone, a cellular phone, or a satellite phone. The user device 102 and/or the user device 106 alternatively may be, for example, an electronic tablet, an electronic book reader, a personal digital assistant (PDA), a portable music player, or a computer capable of communication with the user device 106 or the user device 102, respectively. The user device 102 and/or the user device 106 may have various input/output devices with which a user may interact to provide and receive audio, text, video, and/or other forms of data. The user device 102 and/or the user device 106 may allow a user to interact with the user device 106 or the user device 102, respectively, over the network 104 as described herein.

In some embodiments, the user device 102 and/or the user device 106 may be embodied as any type of device capable of executing an application and otherwise performing the functions described herein. For example, in the illustrative embodiment, the user device 102 may be configured to execute an application 108, and the user device 106 may be configured to execute an application 110. It should be appreciated that the applications 108, 110 may be embodied as any type of application suitable for performing the functions described herein. In particular, in some embodiments, the applications 108, 110 may be embodied as a mobile application (e.g., a smartphone application), a cloud-based application, a web application, a thin-client application, and/or another type of application. For example, in some embodiments, one or more of the applications 108, 110 may serve as a client-side interface (e.g., via a web browser) for a web-based application or service. Additionally, although only one application 108, 110 is shown as being executed by the corresponding devices 102, 106, it should be appreciated that each of the devices 102, 106 may be configured to execute other applications in order to perform the functions described herein. As described herein, in some embodiments, a user may interact with the user devices 102, 106 via a graphical user interface (GUI) of the applications 108, 110 in order to conduct an automated dialogue.

In some embodiments, the application 108 and/or the application 110 may be an automated agent configured to automate voice interactions (i.e., a voice bot system) with users, enterprises, other automated agents, and/or other devices/services to achieve particular goals or results as desired by users via the user devices 102, 106. The voice bot system may be embodied as any automated service or system capable of using automation to engage with users, enterprises, other automated agents, and/or other devices/services and otherwise performing the functions described herein. For example, in some embodiments, the voice bot system may operate, for example, as an executable program that can be launched according to demand for the particular voice bot system to initiate a voice communication session (i.e., a "media session," a "call," a "telephony call," or a "phone call") and/or in response to initiation of a voice communication. In some embodiments, the voice bot system may simulate and may process human spoken conversation, which may allow humans to interact with digital devices as if the humans were communicating with another human. The terms "human" and "user" may be used interchangeably herein. In some embodiments, the voice bot system may be as simple as rudimentary programs that answer a simple query with a single-line voice response or as sophisticated as digital assistants that learn and evolve to deliver increasing levels of personalization as they gather and process information. In some embodiments, the voice bot system includes and/or leverages artificial intelligence, adaptive learning, bots, cognitive computing, and/or other automation technologies. For example, in some embodiments, the voice bot system may utilize one or more neural network algorithms, regression algorithms, instance-based algorithms, regularization algorithms, decision tree algorithms, Bayesian algorithms, clustering algorithms, association rule learning algorithms, deep learning algorithms, dimensionality reduction algorithms, rule-based algorithms, ensemble algorithms, artificial intelligence, and/or other suitable machine learning algorithms, artificial intelligence algorithms, techniques, and/or mechanisms. The voice bot system may be physically located in, and performed by, the user devices 102, 106 whereas other aspects of the end user-side system may be physically located in, and executed by, a cloud computing service. A voice bot system may also be referred to herein as at least one of a voice bot, a voice robot, an AI voice bot, an automated voice robot, a voice dialogue system, a conversational voice agent, an automated voice resource, and a bot.

The voice bot system may include a text-to-speech system (i.e., a "TTS system"). The TTS system may be embodied as any service or system capable of synthesizing speech from text and otherwise performing the functions described herein. The voice bot system may also include a speech to text and/or automatic speech recognition system (i.e., a "STT/ASR system"). The STT/ASR system may be embodied as any service or system capable of converting speech to text and otherwise performing the functions described herein. The TTS system and/or the STT/ASR system may include one or more processors and instructions stored in machine-readable media that are executed by the processors to perform various operations. In some embodiments, the machine-readable media may include non-transitory storage media, such as hard disks and hardware memory systems.

It should be appreciated that the voice bot system may be an inbound voice bot system or an outbound voice bot system. For example, in some embodiments, an outbound voice bot system may initiate a voice communication session with an inbound voice bot system (i.e., an outbound voice bot system may make an outbound telephony call to an inbound voice bot system). An inbound voice bot system may receive the initiated voice communication session from the outbound voice bot system (i.e., may receive an outbound telephony call from an outbound voice bot system). In some embodiments, the inbound voice bot system and/or the outbound voice bot system may be capable of transmitting a speech communication and/or a machine language communication and completing an automated dialogue using speech and/or machine language. An automated dialogue may be an automated conversation between an outbound voice bot system and an inbound voice bot system. In some embodiments, the automated dialogue may be conducted without human involvement. In some embodiments, the automated dialogue may be conducted with human involvement. The outbound voice bot system may also be referred to herein as the calling bot or the outbound automated voice resource. The inbound voice bot system may also be referred to herein as the called bot or the inbound automated voice resource.

It should be appreciated that the inbound voice bot system and the outbound voice bot system may be included in enterprises that are included in an enterprise system. The enterprise system may be embodied as any one or more types of devices/systems that are capable of functioning as a unit and interacting via a technological platform to exchange data and other resources and otherwise performing the functions described herein. For example, in the illustrative embodiment, the enterprise system may include an enterprise that includes the outbound voice bot system and an enterprise that includes the inbound voice bot system. The enterprise system may include additional enterprises depending on the particular embodiment. In some embodiments, the additional enterprises may include voice bot systems. The enterprise system may be a private system, for example, in which any enterprises not included in the enterprise system cannot access the technological platform without either being added to the enterprise system or being given permission to access the technological platform via the enterprise system. It should be further appreciated that the enterprises included in the enterprise system may or may not be associated with related legal entities (e.g., subsidiary companies, daughter companies, other companies that are owned or controlled by another company such as a parent company, etc.) depending on the particular embodiment. Further, although the enterprises of the enterprise system are described herein as being associated with one another (e.g., in a private system), in other embodiments, it should be appreciated that the enterprises may be associated with one another only insofar as they are configured to communicate with the user devices 102, 106 via the network 104 and otherwise perform the functions described herein.

The network 104 may be embodied as any one or more types of communication networks that are capable of facilitating communication between the various devices communicatively connected via the network 104. As such, the network 104 may include one or more networks, routers, switches, access points, hubs, computers, and/or other intervening network devices. For example, the network 104 may be embodied as or otherwise include one or more cellular networks, telephone networks, local or wide area networks, publicly available global networks (e.g., the Internet), ad hoc networks, short-range communication links, or a combination thereof. In some embodiments, the network 104 may include a circuit-switched voice or data network, a packet-switched voice or data network, and/or any other network able to carry voice and/or data. In particular, in some embodiments, the network 104 may include Internet Protocol (IP)-based and/or asynchronous transfer mode (ATM)-based networks. In some embodiments, the network 104 may handle voice traffic (e.g., via a Voice over IP (VOIP) network), web traffic, and/or other network traffic depending on the particular embodiment and/or devices of the system 100 in communication with one another. In various embodiments, the network 104 may include analog or digital wired and wireless networks (e.g., IEEE 802.11 networks, Public Switched Telephone Network (PSTN), Integrated Services Digital Network (ISDN), and Digital Subscriber Line (xDSL)), Third Generation (3G) mobile telecommunications networks, Fourth Generation (4G) mobile telecommunications networks, Fifth Generation (5G) mobile telecommunications networks, a wired Ethernet network, a private network (e.g., such as an intranet), radio, television, cable, satellite, and/or any other delivery or tunneling mechanism for carrying data, or any appropriate combination of such networks. The network 104 may enable connections between the various devices/systems 102, 106 of the system 100. It should be appreciated that the various devices/systems 102, 106 may communicate with one another via different networks 104 depending on the source and/or destination devices 102, 106.

In cloud-based embodiments, the user device 102, the network 104, and/or the user device 106 (and/or one or more portions thereof) may be embodied as a cloud-based system executing in a cloud computing environment; however, it should be appreciated that, in other embodiments, the user device 102, the network 104, and/or the user device 106 (and/or one or more portions thereof) may be embodied as one or more systems executing outside of a cloud computing environment. In cloud-based embodiments, the user device 102, the network 104, and/or the user device 106 (and/or one or more portions thereof) may be embodied as a server-ambiguous computing solution, for example, that executes a plurality of instructions on-demand, contains logic to execute instructions only when prompted by a particular activity/trigger, and does not consume computing resources (or consumes nominal resources) when not in use. That is, the user device 102, the network 104, and/or the user device 106 (and/or one or more portions thereof) may be embodied as a virtual computing environment residing "on" a computing system (e.g., a distributed network of devices) in which various $3^{rd}$ party virtual functions may be executed corresponding with the functions of the user device 102, the network 104, and/or the user device 106 (and/or one or more portions thereof) described herein. For example, when an event occurs (e.g., data is transferred to the network 104 for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of data is made by a user (e.g., via an appropriate user interface to the network 104), the appropriate virtual function(s) may be executed to perform the actions before eliminating the instance of the virtual function(s).

It should be appreciated that each of the user device 102, network 104, and user device 106 may be embodied as (or include) one or more computing devices similar to the computing device 200 described below in reference to FIG. 2. For example, in the illustrative embodiment, each of the user device 102, network 104, and user device 106 may include a processing device 202 and a memory 206 having stored thereon operating logic 208 (e.g., a plurality of instructions) for execution by the processing device 202 for operation of the corresponding device.

Figure 2:
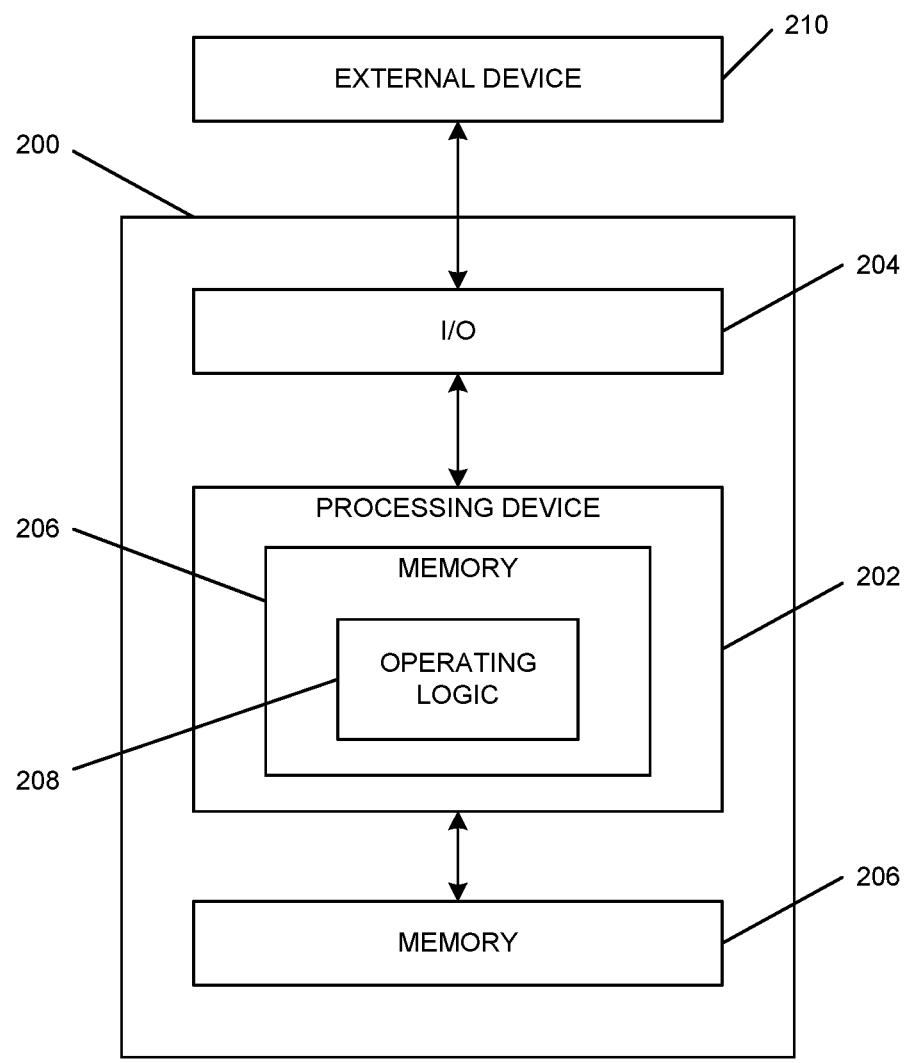
FIG. 2 is a simplified block diagram of at least one embodiment of a computing system.

Referring now to FIG. 2, a simplified block diagram of at least one embodiment of a computing device 200 is shown. The illustrative computing device 200 depicts at least one embodiment of a user device, a network, and/or another user device that may be utilized in connection with the user device 102, the network 104, and/or the user device 106 illustrated in FIG. 1. Depending on the particular embodiment, the computing device 200 may be embodied as a server, desktop computer, laptop computer, tablet computer, notebook, netbook, Ultrabook™, cellular phone, mobile computing device, smartphone, wearable computing device, personal digital assistant, Internet of Things (IoT) device, processing system, wireless access point, router, gateway, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 200 may be configured to use any one or more communication technologies (e.g., wireless or wired communications) and associated protocols (e.g., Ethernet, Bluetooth®, Wi-Fi®, WiMAX, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as the user device 102, the network 104, and/or the user device 106. Further, in some embodiments, the external device 210 may be embodied as another computing device, switch, diagnostic tool, controller, printer, display, alarm, peripheral device (e.g., keyboard, mouse, monitor/display, touch screen display, speakers, headphones, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is programmable and executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable type, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

Figure 3:
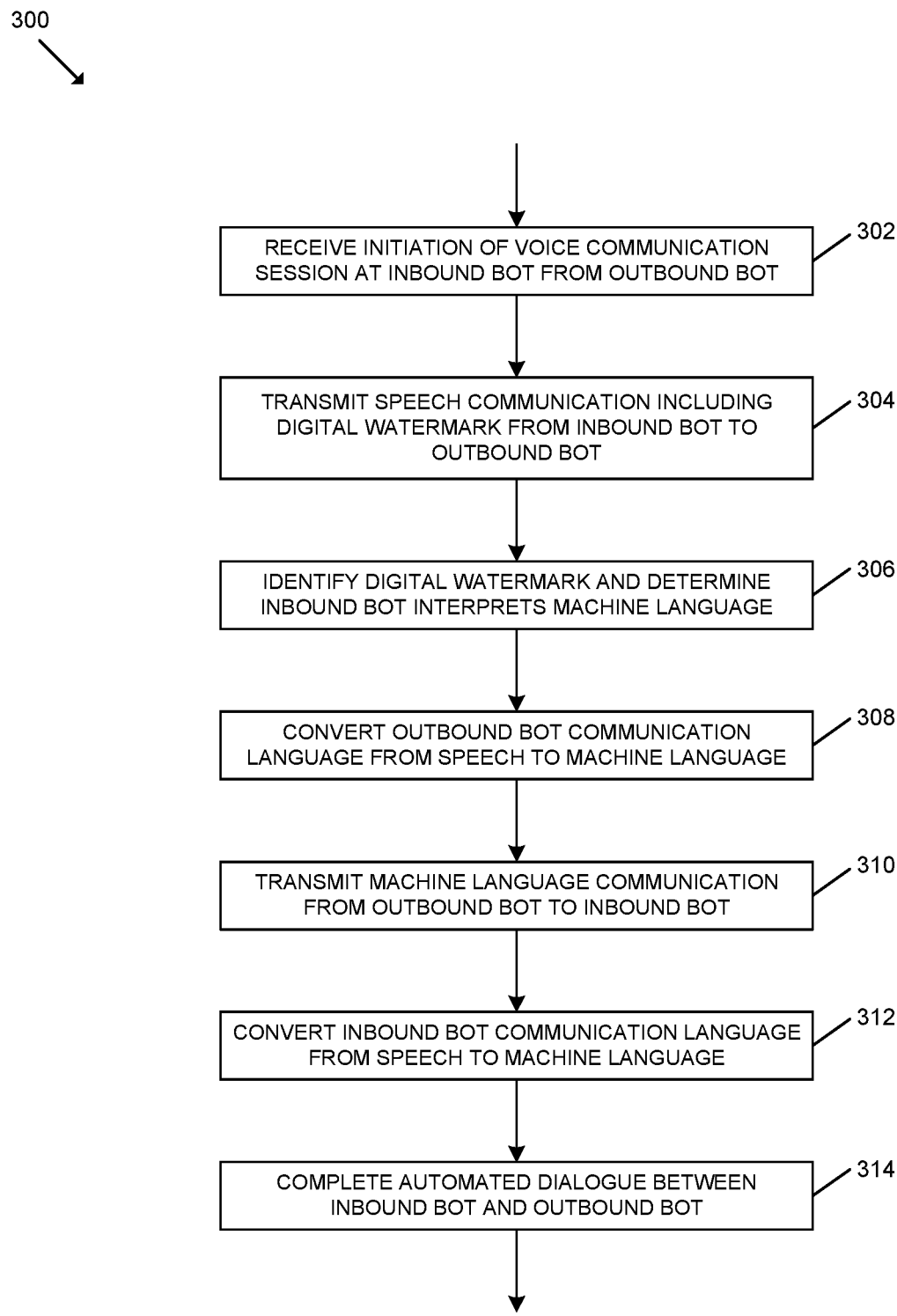
FIG. 3 is a simplified flow diagram of at least one embodiment of a method for conducting an automated dialogue using the system of FIG. 1.

Referring now to FIG. 3, in use, the system 100 may execute a method 300 for conducting an automated dialogue between an inbound automated voice resource and an outbound automated voice resource during a voice communication session. It should be appreciated that the particular blocks of the method 300 are illustrated by way of example, and such blocks may be combined or divided, added or removed, and/or reordered in whole or in part depending on the particular embodiment, unless stated to the contrary. Prior to execution of the method 300, it should be appreciated that a user may interact with the user device 102 via a user interface of the application 108 (e.g., the outbound voice bot system and/or a graphical user interface) in order to communicate a request to complete an action with another user and/or enterprise (e.g., the user device 106, via the application 110, or more particularly, the inbound voice bot system) via the network 104. For example, a user may communicate a request to schedule a dinner reservation with a restaurant via a phone call using the user device 102 (e.g., via the application 108, or more particularly, the outbound voice bot system). The user device 102 (e.g., via the application 108, or more particularly, the outbound voice bot system) may initiate a voice communication session with the user device 106 (e.g., via the application 110, or more particularly, the inbound voice bot system) (i.e., the outbound voice bot system may make an outbound telephony call to an inbound voice bot system). For example, the user device 102 (e.g., via the application 108, or more particularly, the outbound voice bot system) may make an outbound phone call to the restaurant to schedule a dinner reservation with a restaurant using the user device 106 (e.g., via the application 110, or more particularly, the inbound voice bot system).

The illustrative method 300 may begin with block 302 in which the system 100 (e.g., the user device 106, via the application 110, or more specifically, the inbound voice bot system) may receive the initiation of the voice communication session from the user device 102 (e.g., via the application 108, or more particularly, the outbound voice bot system) via the network 104 (i.e., the inbound voice bot system may receive the outbound telephony call from the outbound voice bot system). For example, the restaurant may receive the phone call regarding the request to schedule the dinner reservation using the user device 106 (e.g., via the application 110, or more specifically, the inbound voice bot system) from the user device 102 (e.g., via the application 108, or more particularly, the outbound voice bot system) of the user.

In block 304, the system 100 (e.g., the user device 106, via the application 110, or more specifically, the inbound voice bot system) may transmit a speech communication having a digital watermark embedded in the speech communication to the user device 102 (e.g., via the application 108, or more particularly, the outbound voice bot system). The speech communication may be a human speech communication. For example, the user device 106, via the application 110, or more specifically, the inbound voice bot system, of the restaurant may automatically transmit a greeting or welcome message (e.g., "Welcome to ABC Restaurant. How may I be of assistance"?) having a digital watermark embedded therein to the user device 102 (e.g., via the application 108, or more specifically, the outbound voice bot system) of the user. The digital watermark may be a marker covertly embedded in the speech communication. The purpose of the digital watermark may be to allow the user device 102 (e.g., via the application 108, or more particularly, the outbound voice bot system) to identify that it is having a dialogue with another computing system (i.e., the inbound voice bot system) and to convert the communication language from speech to machine language, which is a more efficient manner of communicating between computing systems (i.e., the outbound voice bot system and the inbound voice bot system).

It should be appreciated that the user device 106 (e.g., via the application 110, or more specifically, the inbound voice bot system) may not know whether it is having a dialogue with a user/human or a computing system (e.g., the outbound voice bot system) at the initiation of the voice communication session when it transmits the speech communication to the user device 102 (e.g., via the application 108, or more particularly, the outbound voice bot system). The user device 106 (e.g., via the application 110, or more specifically, the inbound voice bot system) may assume that it is having a dialogue with a user/human when it transmits the speech communication. An advantage of the digital watermark according to an embodiment may be that the digital watermark is inaudible to humans. In other words, humans may not hear any tone/beep when hearing a speech communication having a digital watermark embedded in such speech communication. If a user initiates a voice communication session via the user device 102 (e.g., via the application 108, or more particularly, the outbound voice bot system) and receives a speech communication embedding the inaudible digital watermark from the user device 106 (e.g., via the application 110, or more specifically, the inbound voice bot system), the user experience will not be diminished since the user will not know that the digital watermark is present in the speech communication. The digital watermark may be identified/detected by only computing systems (e.g., the outbound voice bot system and the inbound voice bot system).

The process of watermarking may include hiding digital information in the speech communication. The embedding method/technique used may be a least significant bit coding technique, a quantization method, or a phase coding technique. More than one digital watermark may be embedded in the speech communication. In some embodiments, the speech communication may include several different watermarks at the same time.

It should be appreciated that the digital watermark may be prerecorded or generated in real time. In some embodiments, the digital watermark may be embedded in a prerecorded speech communication before the initiation of the voice communication session. In some embodiments, a voice bot system (e.g., using a TTS system) may generate and may embed the digital watermark in the speech communication in real time after the initiation of the voice communication session (i.e., during the voice communication session).

The digital watermark may be robust with respect to transformations if the embedded information may be detected from the speech communication, even if degraded by any number of transformations. Various techniques may be used to enhance the robustness of the digital watermark to ensure that the digital watermark cannot be easily removed or damaged by intermediary processing devices in the network 104. The digital watermark may be imperceptible if the watermarked content is perceptually equivalent to the original, unwatermarked content (i.e., the speech communication). In some embodiments, the digital watermark may be perceptible only under certain conditions, including, for example, only after using an algorithm. The digital watermark is a passive protection tool since it marks data but does not degrade or control access to the data.

Embedding a digital watermark in a speech communication (i.e., a speech signal) that is transmitted via the network 104 (e.g., a telephone network) is a complex process. A speech communication/signal may be highly compressed for efficient transmission via the network 104. Codecs may be used to compress a speech communication/signal so that less space it utilized when the speech communication/signal is being transmitted over the network. A codec may be a computing system that encodes or a decodes the speech communication/signal. In some embodiments, the codecs may use algorithms that are designed to compress the speech communication/signal in a manner that the speech communication/signal remains audible but uses significantly less space as the speech communication/signal is transmitted over the network 104. In some embodiments, the codecs may include a coder-decoder pair that are designed to minimize the amount of bandwidth used when transmitting the speech communication/signal over the network 104. A speech communication/signal transmitted over the network 104 may incur multiple encoding and decoding steps with different codec algorithms. Codecs may include, without limitation, G.729, G.723, GSM 06.10, Adaptive Multi-Rate ("AMR"), Opus, etc. The codecs may be designed to remove any redundancies that are inaudible to humans. A problem according to an embodiment may be that the digital watermark is inaudible to humans and must survive the low bit-rate speech coding process (i.e., encoding/decoding stages) that is designed to remove the inaudible redundancies from the speech communication/signal to minimize the amount of bandwidth used when the speech communication/signal is being transmitted over the network 104. It should be appreciated that the digital watermark needs to be designed in a manner that may survive low bit-rate speech coding. In some embodiments, algorithms may be used that allow the digital watermark to survive the low bit-rate speech coding process. In some embodiments, an algorithm may be used to signal the presence or absence of a digital watermark.

The digital watermark may also encounter other signal conditioning equipment (e.g., echo cancellers, gain controllers, etc.) or may be transmitted over analog lines and thus incur several channel distortions, which further illustrates the need for a robust digital watermark. On the other hand, the amount of data associated with the digital watermark that may need to be transmitted via the network 104 may be low. In some embodiments, a single bit of data associated with the digital watermark may be transmitted via the network 104. Additionally, in some embodiments, zero to 10 seconds of audio (e.g., the greeting/welcome message, the response to the greeting/welcome message, etc.) may be transmitted via the network.

In block 306, the system 100 (e.g., the user device 102, via the application 108, or more specifically, the outbound voice bot system) may utilize automatic speech recognition to analyze the speech communication received from the user device 106 (e.g., via the application 110, or more specifically, the inbound voice bot system). The user device 102 (e.g., the application 108, or more specifically, the outbound voice bot system) may identify the digital watermark that is embedded in the speech communication and may determine that the user device 106 (e.g., via the application 110, or more specifically, the inbound voice bot system) interprets machine language. For example, the user device 102 (e.g., via the application 108, or more specifically, the outbound voice bot system) of the user may use automatic speech recognition to analyze the restaurant's greeting/welcome message to identify the digital watermark and determine that the restaurant's user device 106 (e.g., via the application 110, or more specifically, the inbound voice bot system) interprets machine language. The machine language may be machine code or object code, which may include, for example, a set of binary digits 0 and 1. The machine language may be any structured notation or any data format. It should be appreciated that any type of machine language that can be understood by a computing system may be utilized in the method 300.

In block 308, the system 100 (e.g., the user device 102, via the application 108, or more specifically, the outbound voice bot system) may convert the communication language of the user device 102 from speech to machine language. In some embodiments, the user device 102 (e.g., the application 108, or more specifically, the outbound voice bot system) may determine the type of machine language to convert to in response to evaluating the user device 106 (e.g., via the application 110, or more specifically, the inbound voice bot system) type. In an embodiment in which the user device 102 (e.g., the application 108, or more specifically, the outbound voice bot system) and the user device 106 (e.g., via the application 110, or more specifically, the inbound voice bot system) may be included in an enterprise system as described herein, the user device 102 may utilize a technological platform to exchange data with the user device 106 to determine the user device 106 type and the type of machine language the user device 106 may interpret. In an embodiment in which the user device 102 (e.g., the application 108, or more specifically, the outbound voice bot system) and the user device 106 (e.g., via the application 110, or more specifically, the inbound voice bot system) may not be included in an enterprise system as described herein, the user device 102 may utilize the network 104 to evaluate a particular registry having details regarding the user device 106 type and the type of machine language the user device 106 may interpret.

In block 310, the system 100 (e.g., the user device 102, via the application 108, or more specifically, the outbound voice bot system) may transmit a machine language communication to the user device 106 (e.g., via the application 110, or more specifically, the inbound voice bot system). For example, the user device 102 (e.g., via the application 108, or more specifically, the outbound voice bot system) of the user may automatically transmit a message (e.g., "Hello. I would like to make a dinner reservation for two people at ABC Restaurant next Saturday night at 7:00 PM.") to the user device 106 (e.g., via the application 110, or more specifically, the inbound voice bot system) of the restaurant. In some embodiments, the user device 102 (e.g., the application 108, or more specifically, the outbound voice bot system) and the user device 106 (e.g., via the application 110, or more specifically, the inbound voice bot system) may establish a separate communication connection other than the voice communication session. For example, the user device 102 (e.g., the application 108, or more specifically, the outbound voice bot system) and the user device 106 (e.g., via the application 110, or more specifically, the inbound voice bot system) may utilize an inter-service communication session such as REST or GRPC. The inter-service communication may be a synchronous communication or an asynchronous communication. In some embodiments, the user device 102 (e.g., the application 108, or more specifically, the outbound voice bot system) and the user device 106 (e.g., via the application 110, or more specifically, the inbound voice bot system) may end the voice communication session in response to determining that such devices interpret machine language and may communicate via short message service (i.e., SMS, text messaging, etc.).

In block 312, the system 100 (e.g., the user device 106, via the application 110, or more specifically, the inbound voice bot system) may convert the communication language of the user device 106 from speech to machine language in response to receiving the machine language communication from the user device 102 (e.g., the application 108, or more specifically, the outbound voice bot system) and determining that the user device 102 interprets machine language. In block 314, the user device 102 (e.g., via the application 108, or more specifically, the outbound voice bot system) and the user device 106 (e.g., via the application 110, or more specifically, the inbound voice bot system) may complete the automated dialogue using machine language. For example, the user device 102 (e.g., via the application 108, or more specifically, the outbound voice bot system) of the user and the user device 106 (e.g., via the application 110, or more specifically, the inbound voice bot system) of the restaurant may automatically transmit one or more additional messages back and forth in machine language until the user's dinner reservation at ABC Restaurant is scheduled for two people next Saturday night at 7:00 PM.

Referring back to block 302, in an embodiment, the system 100 (e.g., the user device 106, via the application 110, or more specifically, the inbound voice bot system) may receive the initiation of the voice communication session coupled with a speech communication having a digital watermark embedded in the speech communication from the user device 102 (e.g., via the application 108, or more particularly, the outbound voice bot system) via the network 104. For example, in this particular embodiment, the restaurant may receive the phone call regarding the request to schedule the dinner reservation using the user device 106 (e.g., via the application 110, or more specifically, the inbound voice bot system) from the user device 102 (e.g., via the application 108, or more particularly, the outbound voice bot system) of the user, and the user device 102 may transmit a greeting/welcome message (e.g., "Hello. I am an automated bot calling on behalf of Lisa. I would like to make a dinner reservation for two people at ABC Restaurant next Saturday night at 7:00 PM.") having a digital watermark embedded in the greeting/welcome message before the user device 106 is able to transmit a greeting/welcome message. In this particular embodiment, the user device 102 (e.g., via the application 108, or more specifically, the outbound voice bot system) and the user device 106 (e.g., via the application 110, or more specifically, the inbound voice bot system) may be interchanged with each other in the method 300 (e.g., see blocks 306-314). In this particular embodiment, the user device 102 may perform the functions of the user device 106 in the method 300, and the user device 106 may perform the functions of the user device 102 in the method 300. For example, in this particular embodiment, the user device 106 (e.g., via the application 110, or more specifically, the inbound voice bot system) may identify the digital watermark and determine that the user device 102 (e.g., via the application 108, or more specifically, the outbound voice bot system) interprets machine language (e.g., see block 306), may convert the communication language of the user device 106 from speech to machine language (e.g., see block 308), and may transmit a machine language communication from the user device 106 to the user device 102 (e.g., see block 310). Additionally, in this particular embodiment, the user device 102 may convert the communication language of the user device 102 from speech to machine language (e.g., see block 312). Further, in this particular embodiment, the user device 102 and the user device 106 may complete the automated dialogue using machine language (e.g., see block 314).

Referring back to block 304, in an embodiment, the system 100 (e.g., the user device 106, via the application 110, or more specifically, the inbound voice bot system) may transmit a speech communication having a damaged digital watermark embedded in the speech communication to the user device 102 (e.g., via the application 108, or more particularly, the outbound voice bot system). For example, in this particular embodiment, the user device 106, via the application 110, or more specifically, the inbound voice bot system, of the restaurant may automatically transmit a greeting or welcome message (e.g., "Welcome to ABC Restaurant. How may I be of assistance"?) having a damaged digital watermark embedded therein to the user device 102 (e.g., via the application 108, or more specifically, the outbound voice bot system) of the user. In this particular embodiment, the user device 102 (e.g., via the application 108, or more specifically, the outbound voice bot system) and the user device 106 (e.g., via the application 110, or more specifically, the inbound voice bot system) may be interchanged with each other in the method 300 (e.g., see blocks 304-314). In this particular embodiment, the user device 102 may perform the functions of the user device 106 in the method 300, and the user device 106 may perform the functions of the user device 102 in the method 300. For example, the user device 102 (e.g., via the application 108, or more specifically, the outbound voice bot system) may transmit a speech communication having a digital watermark embedded in the speech communication to the user device 106 (e.g., via the application 110, or more specifically, the inbound voice bot system) in response to receiving the speech communication from the user device 106 (e.g., see block 304). Additionally, in this particular embodiment, the user device 106 may identify the digital watermark and determine that the user device 102 interprets machine language (e.g., see block 306), may convert the communication language of the user device 106 from speech to machine language (e.g., see block 308), and may transmit a machine language communication from the user device 106 to the user device 102 (e.g., see block 310). Additionally, in this particular embodiment, the user device 102 may convert the communication language of the user device 102 from speech to machine language (e.g., see block 312). Further, in this particular embodiment, the user device 102 and the user device 106 may complete the automated dialogue using machine language (e.g., see block 314).

Although the blocks 302-314 are described in a relatively serial manner, it should be appreciated that various blocks of the method 300 may be performed in parallel in some embodiments.

What is claimed is:

1. A method for conducting an automated dialogue between a first automated voice resource and a second automated voice resource during a voice communication session, the method comprising:

transmitting, by the first automated voice resource, a first speech communication to the second automated voice resource during the voice communication session, wherein the first speech communication comprises machine-generated speech that is comprehensible to a human listener, wherein a digital watermark is embedded in the first speech communication such that the digital watermark survives encoding and decoding of the first speech communication, and wherein the digital watermark is comprehensible to the first automated voice resource and the second automated voice resource and inaudible to the human listener;

receiving, by the first automated voice resource, a transmission from the second automated voice resource indicating a recognition by the second automated voice resource of the digital watermark, wherein the transmission from the second automated voice resource comprises machine language;

transmitting, by the first automated voice resource, a second communication comprising machine language to the second automated voice resource in response to receiving the transmission indicating recognition by the second automated voice resource of the digital watermark and based on determining, from a registry accessible to the first automated voice resource, a device type of the second automated voice resource and a corresponding machine language type, and encoding the second communication according to the machine language type corresponding with the device type of the second automated voice resource; and completing the automated dialogue between the first automated voice resource and the second automated voice resource using machine language.

2. The method of claim 1, wherein the digital watermark is embedded in the first speech communication before an initiation of the voice communication session.

3. The method of claim 1, wherein the first automated voice resource embeds the digital watermark in the first speech communication in real time after an initiation of the voice communication session.

4. The method of claim 1, wherein completing the automated dialogue between the first automated voice resource and the second automated voice resource using machine language comprises:
    ending the voice communication session; and
    utilizing an inter-service communication session.

5. The method of claim 1, wherein the digital watermark is embedded in the first speech communication such that the digital watermark survives one of G.729, G.723, or GSM 06.10 encoding and decoding of the first speech communication.

6. The method of claim 1, wherein the digital watermark is embedded in the first speech communication such that the digital watermark survives Adaptive Multi-Rate (AMR) encoding and decoding of the first speech communication.

7. The method of claim 1, wherein the digital watermark is embedded in the first speech communication such that the digital watermark survives encoding and decoding of the first speech communication that removes inaudible redundancies from the first speech communication to reduce a bandwidth used when the first speech communication is transmitted to the second automated voice resource.

8. A method for conducting an automated dialogue between an inbound automated voice resource and an outbound automated voice resource during a voice communication session, the method comprising:

receiving at the inbound automated voice resource an initiation of the voice communication session from the outbound automated voice resource;

transmitting, by the inbound automated voice resource, a speech communication to the outbound automated voice resource during the voice communication session, wherein the speech communication comprises machine-generated speech that is comprehensible to a human listener, wherein a digital watermark is embedded in the speech communication such that the digital watermark survives encoding and decoding of the speech communication, and wherein the digital watermark is inaudible to the human listener;

identifying, by the outbound automated voice resource, the digital watermark in response to analyzing the speech communication;

converting, by the outbound automated voice resource, an outbound automated voice resource communication language from speech to machine language in response to determining that the inbound automated voice resource interprets machine language based on the digital watermark and based on determining, from a registry accessible to the outbound automated voice resource, a device type of the inbound automated voice resource and a corresponding machine language type;

transmitting, by the outbound automated voice resource, a machine language communication encoded according to the machine language type corresponding with the device type of the inbound automated voice resource to the inbound automated voice resource;

converting, by the inbound automated voice resource, an inbound automated voice resource communication language from speech to machine language in response to determining that the outbound automated voice resource interprets machine language based on the machine language communication; and completing the automated dialogue between the inbound automated voice resource and the outbound automated voice resource using machine language.

9. The method of claim 8, wherein the digital watermark is embedded in the speech communication before the initiation of the voice communication session.

10. The method of claim 8, wherein the inbound automated voice resource embeds the digital watermark in the speech communication in real time after the initiation of the voice communication session.

11. The method of claim 8, wherein completing the automated dialogue between the inbound automated voice resource and the outbound automated voice resource using machine language comprises:
    ending the voice communication session; and
    utilizing an inter-service communication session.

12. The method of claim 8, further comprising transmitting, by the inbound automated voice resource, a second machine language communication to the outbound automated voice resource in response to converting the inbound automated voice resource communication language from speech to machine language.

13. The method of claim 8, further comprising embedding, by the inbound automated voice resource, the digital watermark into the speech communication utilizing a least significant bit algorithm.

14. The method of claim 8, further comprising embedding, by the inbound automated voice resource, the digital watermark into the speech communication utilizing quantization.

15. The method of claim 8, further comprising embedding, by the inbound automated voice resource, the digital watermark into the speech communication utilizing phase coding.

16. A system for conducting an automated dialogue during a voice communication session, the system comprising:
- at least one processor; and
- at least one memory comprising a plurality of instructions stored thereon that, in response to execution by the at least one processor, causes the system to:
  - transmit, by an automated voice resource, an initiation of the voice communication session;
  - receive at the automated voice resource a speech communication in response to initiation of the voice communication session, wherein the speech communication comprises machine-generated speech that is comprehensible to a human listener, wherein a digital watermark is embedded in the speech communication such that the digital watermark survives encoding and decoding of the speech communication, wherein the digital watermark is inaudible to the human listener;
  - identify, by the automated voice resource, the digital watermark in response to analyzing the speech communication;
  - convert, by the automated voice resource and based on the digital watermark, an automated voice resource communication language from speech to machine language including determining, from a registry accessible to the automated voice resource, a device type of a device that transmitted the speech communication and a corresponding machine language type;
  - transmit, by the automated voice resource, a first machine language communication encoded according to the machine language type corresponding with the device type;
  - receive at the automated voice resource a second machine language communication; and
  - complete the automated dialogue.

17. The system of claim 16, wherein more than one digital watermark inaudible to the human listener is embedded in the speech communication.

18. The system of claim 16, wherein the digital watermark is embedded in the speech communication before the initiation of the voice communication session.

* * * * *